(12) United States Patent
Curado et al.

(10) Patent No.: US 6,497,756 B1
(45) Date of Patent: Dec. 24, 2002

(54) SERVICE LIFE INDICATOR FOR RESPIRATOR CARTRIDGE

(75) Inventors: Len Curado, East Greenwich; Edna M. deMedeiros, West Warwick, both of RI (US)

(73) Assignee: North Safety Products, Inc., Cranston, RI (US)

( * ) Notice: Subject to any disclaimer, the term of this patent is extended or adjusted under 35 U.S.C. 154(b) by 27 days.

(21) Appl. No.: 09/659,296

(22) Filed: Sep. 12, 2000

(51) Int. Cl.[7] .............................................. B01D 53/04
(52) U.S. Cl. ................. 96/117.5; 55/DIG. 33; 55/DIG. 34; 55/DIG. 35; 96/147; 96/416; 128/201.25
(58) Field of Search ............................. 96/117.5, 147, 96/416; 55/502, DIG. 33, DIG. 34, DIG. 35; 128/201.25

(56) References Cited

U.S. PATENT DOCUMENTS

| | | | | |
|---|---|---|---|---|
| 1,537,519 A | * | 5/1925 | Yablick ................. 55/DIG. 34 |
| 2,621,753 A | * | 12/1952 | Urdahl ..................... 96/416 X |
| 3,161,491 A | * | 12/1964 | Gongoll et al. ............... 96/416 |
| 3,171,729 A | * | 3/1965 | Roney et al. ............. 96/117.5 |
| 3,966,440 A | * | 6/1976 | Roberts ..................... 96/117.5 |
| 4,133,656 A | * | 1/1979 | Kippel et al. ................. 96/416 |
| 4,154,586 A | | 5/1979 | Jones et al. ..................... 55/274 |
| 4,155,358 A | | 5/1979 | McAllister et al. ...... 128/146.6 |
| 4,324,558 A | | 4/1982 | Obermayer ............... 23/232 R |
| 4,326,514 A | | 4/1982 | Eian ...................... 128/202.22 |
| 4,428,907 A | * | 1/1984 | Heijenga et al. ........ 55/DIG. 33 |
| 4,530,706 A | | 7/1985 | Jones ........................... 55/275 |
| 4,543,112 A | | 9/1985 | Ackley et al. ................. 55/316 |
| 4,572,725 A | * | 2/1986 | Kojima ...................... 96/416 X |
| 4,684,380 A | * | 8/1987 | Leichnitz ................... 96/117.5 |
| 4,999,034 A | * | 3/1991 | Mager et al. .............. 96/117.5 |
| 5,099,970 A | | 3/1992 | Harris ....................... 192/13 R |
| 5,110,003 A | | 5/1992 | MacWilliams .............. 220/304 |
| 5,297,544 A | | 3/1994 | May et al. ............. 128/202.22 |
| 5,634,426 A | | 6/1997 | Tomlinson et al. .......... 116/207 |
| 5,638,970 A | | 6/1997 | Garby et al. ................. 215/219 |
| 5,720,328 A | | 2/1998 | Ott .............................. 141/312 |
| 5,969,588 A | | 10/1999 | Nelson ........................ 335/229 |
| 6,055,983 A | | 5/2000 | Metzger ................ 128/206.17 |

\* cited by examiner

Primary Examiner—Robert H. Spitzer
(74) Attorney, Agent, or Firm—Abelman, Frayne & Schwab (57) ABSTRACT

A rotationally adjustable respirator cartridge having a self-contained end of service life indicator adjacent the interior of a sidewall of the cartridge shell and in contact with the filter medium provides a color-changing display field that is visible to the wearer of the respirator through a transparent portion of the sidewall. A display window is defined by an opaque border area that surrounds the sensor display field and obscures a predetermined portion of the downstream end of the indicator to provide a desired margin of safety to the wearer. In order to permit the wearer to rotationally position the color-changing display field in the line of sight through the transparent portion of the respirator facepiece, the cartridge is provided with a rotatable mounting assembly that is continuously rotatable in one direction and that forms a seal with the cartridge shell.

26 Claims, 9 Drawing Sheets

SERVICE LIFE INDICATOR FOR RESPIRATOR CARTRIDGE

FIELD OF THE INVENTION

The invention relates to replacement cartridges for full face and half mask respirators containing service life indicators.

BACKGROUND OF THE INVENTION

It is known in the prior art to provide end of service life indicators for replaceable chemical filter cartridges that are used with respirators. For example, U.S. Pat. No. 4,326,514 discloses a cartridge into which is fitted a web or strip that is treated to undergo a color-changing reaction when it is contacted by the type of toxic chemical contaminant(s) for which the respirator is to be used. Since it is taught to extend the strip around all or most of the interior wall surface, this approach can add a significant cost to the manufactured cartridge. Furthermore, the potential for the formation of channels, cracks and non-conformities in the filter bed adjacent the strip can lead to wide variations in the rate of advance of the color changing line and the inability to accurately evaluate the true condition and capacity of the filter to retain or neutralize the contaminant. These problems may explain why this approach does not appear to have been adopted by cartridge manufacturers.

It is also known from the prior art to apply a web or strip such as that described above to the exterior surface of the cartridge so that the color-changing indicator reaction is initiated as soon as the wearer enters an environment containing a toxic chemical with which the indicator is reactive. This approach suffers the drawback of providing only an approximation of the condition of the chemical sorbent material inside the cartridge, and in practice, it has been found that this exterior-mounted indicator has completed its color-change long before the cartridge has reached the end of its useful service life, thereby resulting in the premature changing and disposal of the cartridge. It is also the practice to extend the strip or web of the color-changing indicator around the entire periphery of the cartridge, since the indicator strip must be visible to the wearer when the cartridge is in place on the face mask and the orientation of the cartridge is random when it is threaded onto the mask mounting means. Thus, a much greater length of the indicator strip material than is actually viewable must be applied to each cartridge.

Another means for providing a color-changing indicator for a respirator cartridge is disclosed in U.S. Pat. No. 4,154,586 and U.S. Pat. No. 4,530,706, where the interior of the cartridge is provided with a plurality of compartments in a vertical array, each compartment containing a color-changing indicator material that is visible through the transparent sidewall of the cartridge that also defines one wall of the compartments. The indicator material is separated from the filter sorbent bed by a sidewall. The upstream end of the chamber is covered by a perforated top wall and airborne contaminant travels through the chamber in a path that is parallel to, but separated from the air entering the filter medium. The rate of change of color in the separate chamber is intended to correspond to the condition of the filter medium in the adjacent bed. It is not clear from the disclosure how this relationship is to be attained, particularly if the cartridges are to be mass produced. The construction of cartridges in accordance with these disclosures by molding or otherwise would be complex and expensive. Furthermore, it is not at all clear how a uniform, consistent and reliable product could be mass produced, since the packing or filling of the chambers to a uniform density and compaction in production quantities is not apparent.

It is therefore an object of this invention to provide an improved replacement cartridge and a method for its manufacture that includes a reliable color-changing ESLI with a visual display field that provides for a predetermined margin of safety.

Another object of the invention is to provide an improved replacement cartridge that includes an ESLI, which cartridge can be manufactured economically, that is reliable and consistent in performance and that utilizes components of otherwise conventional construction.

A further important object of the invention is to provide an improved replacement cartridge that incorporates a clearly delineated color-changing indicator display field that permits the wearer of the respirator mask to adjust the position of the installed cartridge so that the display field can be viewed during use.

SUMMARY OF THE INVENTION

The above objects and other advantages are achieved with the present invention in which a replacement respirator cartridge is provided with an improved end of service life indicator, or ESLI. In one preferred embodiment, the cartridge is provided with a display window defined by an opaque border positioned on the sidewall and a chemical sensor having a color-changing display field is secured in position against the interior surface of the sidewall with the display field at least partly aligned with the display window. The sensor can be a deformable, relatively thin, laminated structure having one exterior sidewall that is transparent and through which a color-changing chemical material can be viewed; the opposite wall is formed from a vapor-permeable material through which contaminant molecules, gas and/or vapor can pass to initiate the color-changing reaction.

The color-changing sensor is securely positioned against the interior surface of the sidewall, as by adhesive applied to a portion of the sensor surrounding the color-changing display field. The sidewall of the cartridge is transparent, in at least the area of the display window where the sensor is secured in position.

The permeable sidewall of the sensor is contacted by the activated carbon or such other filter medium as fills the body of the cartridge. In a particularly preferred embodiment, the relative positions of the display window and the display field with respect to the downstream portion of the filter bed are prescribed in order to provide a predetermined minimum margin of safety for the use of the cartridge. For example, assume that the cartridge is rated as having a total useful service life of sixty minutes in a given concentration of contaminant gas by a user expressing average breathing rates and lung capacity. If the sensor extends vertically through 90% of the upper or upstream end of the filter bed, and a 25% safety margin is to be provided for the particular contaminant, the display window is provided with an opaque border that masks the lowest 25% of the filter bed sidewall and covers 15% of the downstream end of the sensor. If a greater or lesser safety margin is desired, the width of the opaque border, or its position relative to the downstream end of the filter bed and or sensor can be adjusted accordingly.

In a preferred embodiment of the invention the sensor is closely-fitted and secured to the interior surface of the shell's sidewall. In one preferred embodiment, the sensor can be secured by adhesive which is provided around the periphery of the display field and covered with a releasable film or strip prior to placement on the sidewall. In an alternative embodiment, (not shown), the sensor is mechanically secured in position at the interior surface of the sidewall, as by one or more spring clips, a retaining bracket or parallel channels affixed to the interior sidewall. In yet another embodiment (not shown), a reactive color-changing composition is formulated into a coating composition that is applied directly to the interior of the sidewall. The composition can be formulated in a polymeric latex or other suitable material that will adhere securely to the wall and permit the color-change to be clearly visible.

Regardless of the means employed for securing the sensors, it is important that the sensor remain in the desired position without movement during use and that it be maintained in intimate contact with the adjacent filter medium without channels or other irregularities, discontinuities or the like to interfere with the uniform migration of contaminants through the adjacent bed and into the permeable wall of the sensor.

In another aspect of the invention, an apparatus and method for mounting the improved ESLI cartridge on the respirator mask provides means for continuously rotating the sealed cartridge to properly align the ESLI sensor for viewing. A continuously rotatable mounting for the cartridge is required to allow the wearer of the respirator to move the color-changing sensor into the wearer's field of view. If the cartridge is attached to a full face mask, the sensor will have to be viewed through the transparent portion of the respirator facepiece. Since the cartridge must be mounted on a male threaded member that is an integral part of the respirator cheek area, for safety reasons it must not be possible for the wearer to unscrew the cartridge as might be required to bring the sensor into the field of view, since unscrewing the cartridge would break the air seal and allow possibly contaminated external air to by-pass the filter cartridge.

In order to avoid this possibility and to permit rotation while at the same time maintaining a secure air-tight seal, a multi-part mounting assembly that includes a rotating seal is provided to thereby permit the cartridge to be rotated continuously in the direction used to install the cartridge, traditionally, the clockwise direction. In one preferred embodiment, a ratchet assembly is employed and the detents or ratchet teeth are molded into the interior surface of the cartridge shell. A threaded flanged insert is placed into the projecting collar portion of the cartridge shell, and the flange is divided into a plurality of segments, each of which segments includes a pawl that engages corresponding teeth formed in the interior surface of the cartridge housing surrounding the threaded collar opening. As in any ratchet, the pawls allow the flange to rotate freely in one direction, but engage the teeth when rotated in the opposite direction, thus causing both members of the assembly to rotate together when it is desired to unscrew and remove the cartridge from the respirator mounting means.

Since the flanged insert must be free to rotate against the cartridge housing, it is necessary to provide an air seal against leakage of contaminated air into the respirator at the point of attachment of the cartridge. In a preferred embodiment, a mechanical seal is provided between the members of the assembly. In an especially preferred embodiment, this sealing is accomplished by providing the internal rim of the neck of the cartridge housing with a rounded projecting bead seal and the adjacent exterior surface of the flanged insert with a corresponding concave seat. The flanged insert is produced from a plastic composition having the requisite deformation and resilience properties that permit it to be press-fitted into the neck portion of the cartridge so that the seal engages the seat.

To complete installation of the respirator cartridge on the mask, the cartridge is screwed onto the male threaded member projecting from the cheek of the respirator until the clicking of the ratchet members is heard. This audible signal assures the wearer that the cartridge has been properly installed, since the threaded members will bring the ratchet assembly into contact only when the male and female threads are properly engaged. This also assures the wearer that the proper seal has been achieved between the respirator and the cartridge. After donning the respirator, the cartridge can then be further turned in the clockwise/tightening direction until the sensor is in the wearer's field of view, the wearer being assured that the cartridge is being turned in the correct direction by the audible clicking sounds. When the cartridge is turned in the counter-clockwise direction, the pawls engage the notches and the cartridge can be removed for replacement.

The present invention provides the user of the respirator to which the cartridges are attached a clear indication of the extent to which the activated carbon contained in the cartridge is being contaminated, and conversely, how much active material is remaining. This is very important to the user, because the life of the cartridge and its contents depends on many variables, including the concentration of the contaminant in the physical area of the user; the rate at which the user is breathing; and the capacity or air volume of each breath. Obviously, a worker exerting himself under strenuous conditions will require considerably more air to sustain himself than a worker in a control booth who may only be monitoring instruments.

In a preferred embodiment, a lower portion of the color-changing sensor adjacent the downstream end of the carbon bed is not visible through the viewing window in the label, thereby providing a margin of safety or time during which the cartridge can continue to function to remove contaminants. The vertical dimension of the display field of the sensor in contact with the carbon bed can be varied in accordance with use requirements and the vertical dimension and position of the viewing window relative to the sensor and/or the bed can be varied to provide a predetermined margin of safety.

It is to be noted that the invention is described with reference to a "cartridge" filter, which is to be understood as being distinguished from a "canister" filter by its somewhat small size and direct attachment to a so-called full-face or half-mask. As will be apparent to one of ordinary skill in the art, the invention can be used in any size filter, where the sensor can be secured in intimate relation with a longitudinal section of the filter bed and viewed through an adjacent transparent display window.

Thus, in its broadest aspect, the improved ESLI cartridge of the invention comprises a cartridge shell that is transparent in at least the area of a sidewall at which the color-changing sensor is placed; the chemical sensor is secured to the interior surface of the sidewall of the cartridge, one side of the sensor having a visually perceptible indicator that forms a display field, preferably a color-changing indicator, the opposite side of the sensor being in touching contact with the activated carbon bed or other filter medium that is packed in the cartridge; a display window defined by an opaque border, where the display window corresponds to at least a portion of the vertical section of the display field of the color-changing sensor; and means for maintaining a seal and means to permit the cartridge to be continuously rotated so that the sensor can be viewed by the wearer of a mask to which the cartridge is attached to bring the sensor into the wearer's field of vision.

BRIEF DESCRIPTION OF THE DRAWINGS

The invention will be further described with reference to the attached drawings in which like elements are referenced by the same numbers and in which.

DESCRIPTION OF THE PREFERRED EMBODIMENTS

Figure 1:
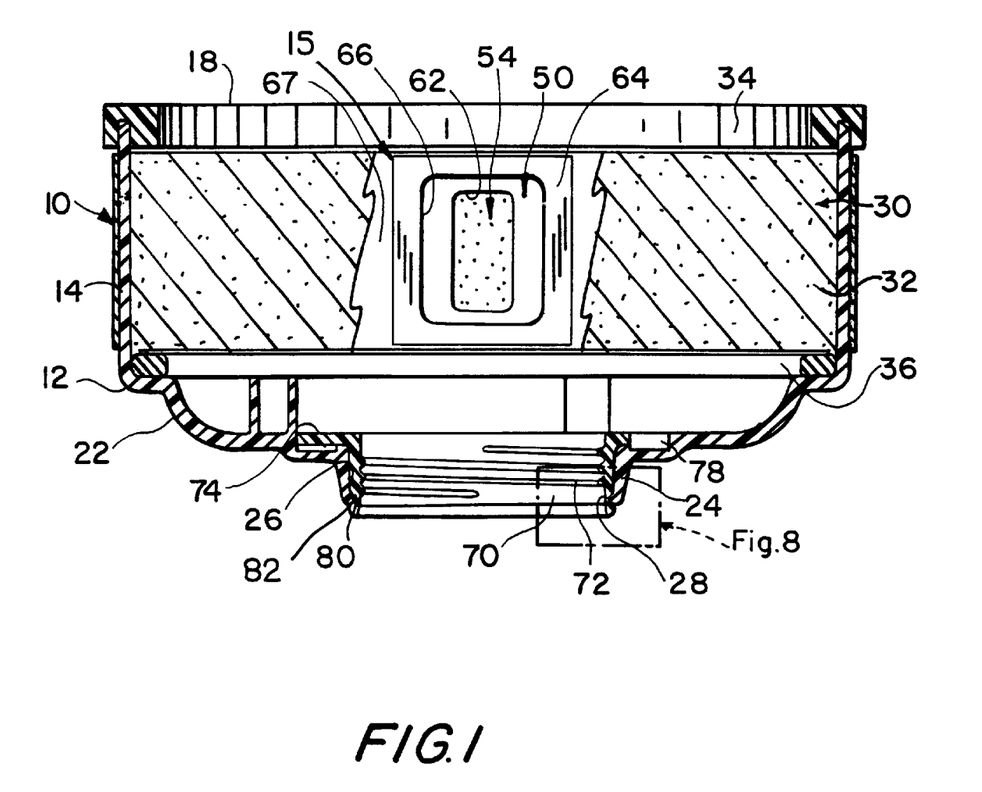
FIG. 1 is a side elevational view partly in section of a cartridge of one embodiment in accordance with the invention.

Referring to FIG. 1, the improved cartridge 10 of the invention is comprised of a generally cylindrical shell 12 formed with a cylindrical sidewall 14 and integral outlet end cover 22, the latter terminating in outwardly extending mounting collar 24 that includes inner wall 26 and annular rim 28. The cartridge shell is provided with inlet end cover 18. The cartridge shell is conveniently manufactured by molding of suitable polymeric compositions in accordance with practices well established in the art. However, in a preferred embodiment of the invention, the sidewall 14 of shell 12 is preferably formed of a transparent polymeric material, such as a styrene-butadiene copolymer. If desired, the shell can be produced so that at least a portion 15 of the sidewall is a transparent material, and the remainder of the sidewall and shell are formed from an opaque material.

Figure 2:
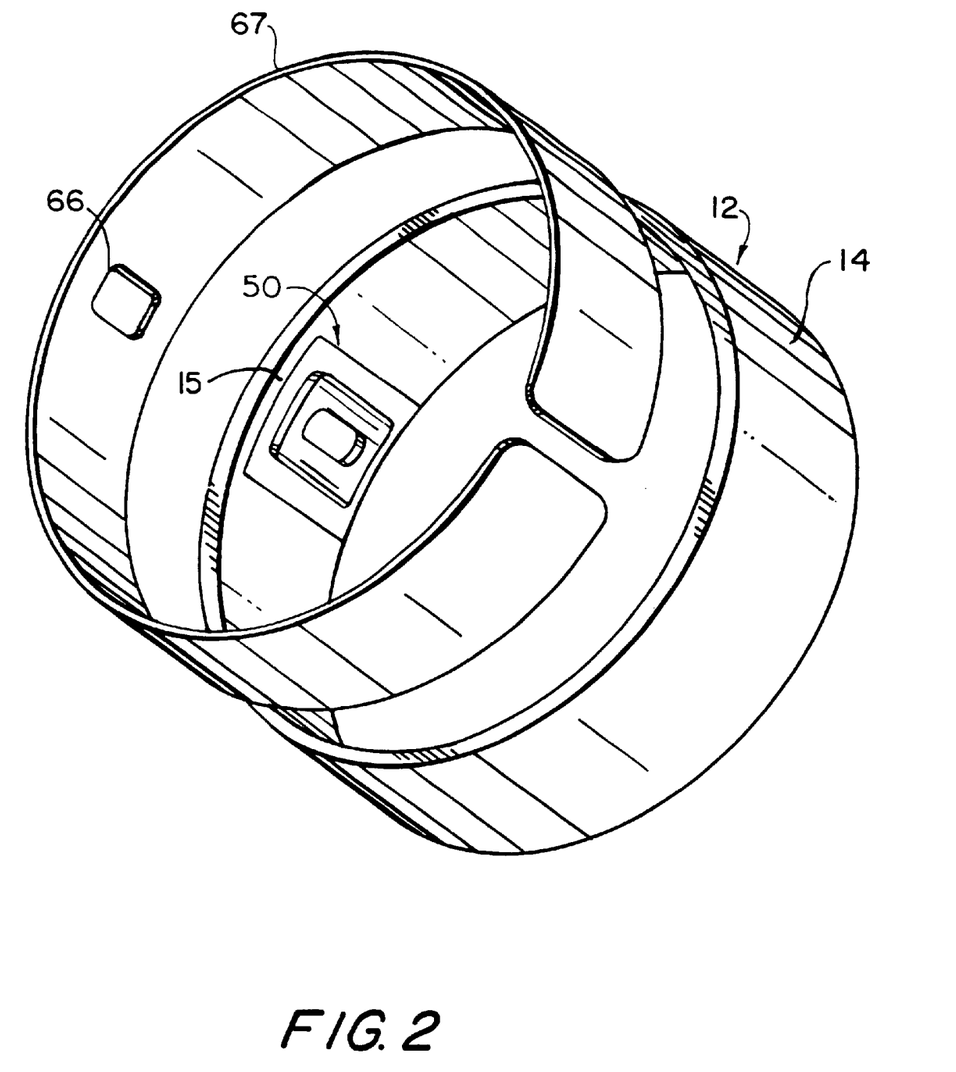
FIG. 2 is an exploded top perspective view showing one preferred embodiment of assembling the improved cartridge of the invention.

With continued reference to FIG. 1, a chemical sensor 50 having a color-changing display field 54 is securely positioned and retained against the interior surface of the transparent section 52 of the sidewall. An opaque border 64 defines a display window 66 through which is visible at least a portion of the sensor's color-changing display field 54. In accordance with a preferred embodiment, best illustrated in FIG. 2, a paper label 67 in the form of an elongated strip is applied to encircle cartridge sidewall 14. In an alternative embodiment, the label can be printed directly on the cartridge shell surface utilizing inks or other appropriate coatings and methods that are well-known in the art. The ink or coating can be applied to the interior, but preferably to the exterior sidewall of the shell 12.

Figure 3:
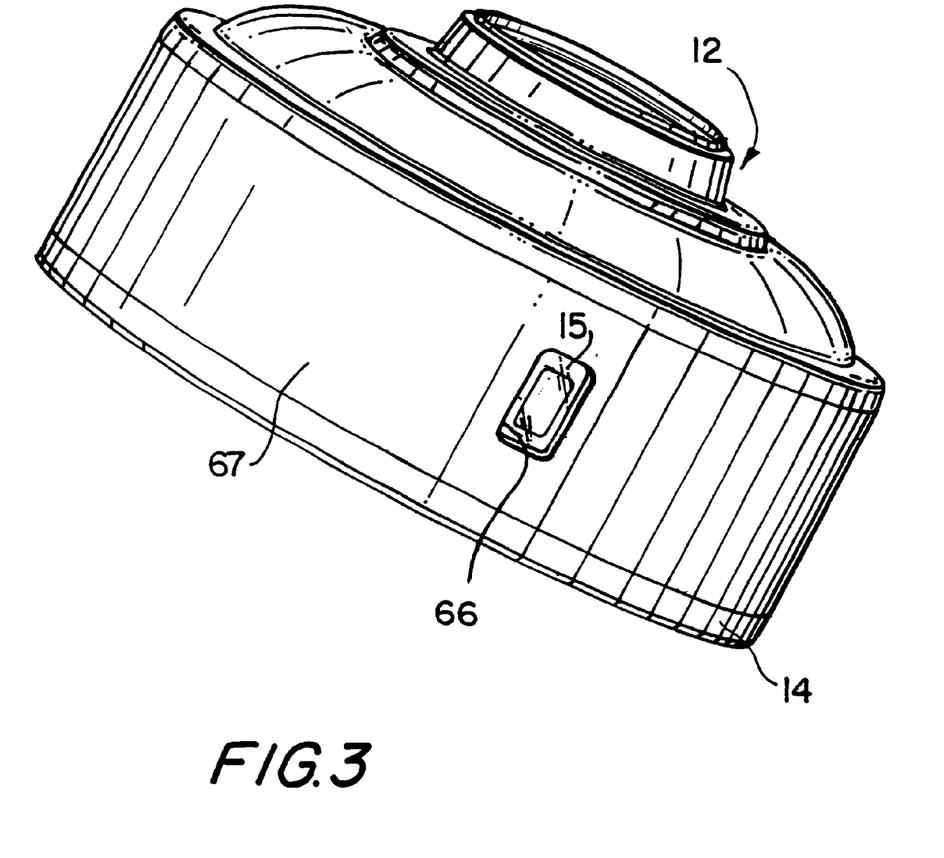
FIG. 3 is a side perspective view showing the completed assembly of FIG. 2.

The label is provided with display window 66, and preferably is otherwise opaque. The label can contain printed instructions, descriptive information or other indicia relating to the use of the cartridge. Paper labels 67 having an adhesive-back can be applied utilizing automated methods and apparatus known to the art, it being understood that proper registry between the label's display window 66 and the sensor's display field 54 must be attained during the assembly. The label 67 incorporating display window 66 is applied to sidewall 14 of the cartridge as shown in FIG. 3. As will be seen from this embodiment, the vertical orientation of the downstream end of display window 66 is displaced towards the lower portion of filter bed 30 and the positioning of the window will be discussed below.

Returning to FIG. 1, the filter bed, referred to generally as 30, is comprised of a uniform and carefully compacted sorbent material 32 such as activated carbon, which is known to adsorb predictable quantities of various types of commonly encountered contaminants in the form of gases and vapors. The filter bed 30 is maintained in a stable compacted condition by intake retaining means 34 and exhaust retaining means 36, the interior surfaces of which define the depth of the filter bed. As is well established in this art, it is important to provide a cartridge in which the sorbent material is of uniform size and where the bed is of uniform composition and compaction, and is free of channels or voids that could result in an uneven flow of air through the bed. In order to minimize the possibility of such channeling and to provide a more accurate indication of the length of useful service life of the filter bed, the improved cartridge of the invention incorporates a chemical sensor having a flat profile and that is of a construction that permits it to be closely fitted to the interior curved surface of sidewall 14. This aspect of the invention allows the improved cartridges to be mass-manufactured in accordance with existing methods and apparatus that are used to produce the molded shells and also in the filling and assembly of the shells with the filter bed sorbent material and conventional retaining means.

Figure 4:
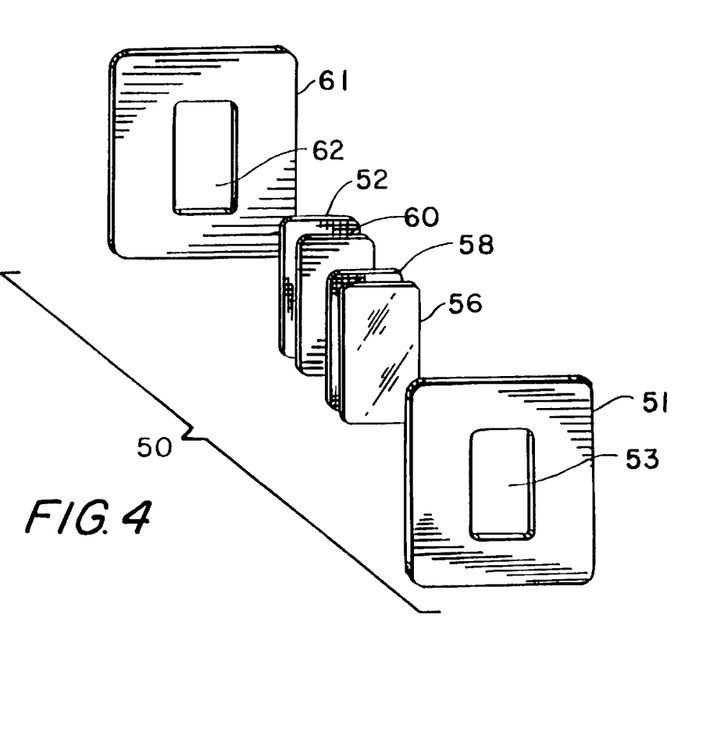
FIG. 4 is an exploded top perspective view of a sensor suitable for use in the practice of the invention.
Figure 4A:
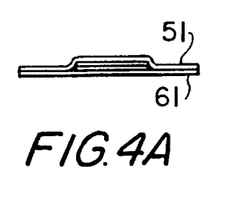
FIG. 4A is an end view in section of the assembled sensor of FIG. 4.
Figure 4B:
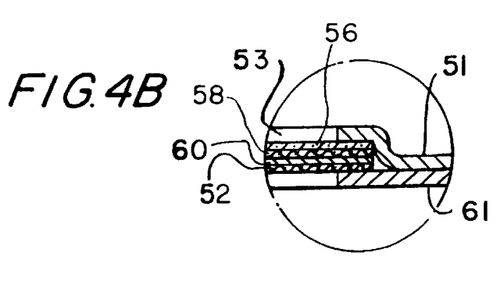
FIG. 4B is an enlarged sectional detail of the sensor shown in FIG. 4A.

As schematically illustrated in the exploded view of FIG. 4, the sensor 50 is a laminated structure formed from a plurality of layers, which can include back enclosure wall 51 and front enclosure wall 61, both of which can be formed from a suitable gauge of aluminum foil to provide a self-sustaining shape and structural integrity as well as a degree of flexibility to permit the sensor to be applied to the shell's curved sidewall 14. Front wall 61 is provided with aperture 62 and back wall 51 with aperture 53. A layer of reactive chemical indicators 60 that change color in response to contact with the contaminant are maintained in position between one or more transparent webs or fine mesh screen material 56 that is positioned against the inside of back wall 51 and a vapor permeable membrane that is adjacent to the interior of front wall 61. As will be understood from FIG. 4, the corresponding cross-sectional schematic view of FIG. 4A and the enlarged detail of FIG. 4B, the color-changing reagent material is initially of a uniform unreacted color and is visible through aperture 62. When the sensor is installed in the shell, the side facing the transparent portion 15 of the sidewall 14 can be visually inspected. The port 62 in front wall 61 permits intimate contact of the filter medium 32 with the vapor permeable screen material 52, so that as the filter bed 30 becomes saturated during use, some of the contaminant molecules in the adjacent bed that have not reached the active filter material migrate to the interior of the sensor and initiate the color-changing reaction with the chemical reagent in interior layer 60. This results in a color-changing front which moves down through the chemical indicator 60 and can be viewed in aperture 62.

Figure 5:
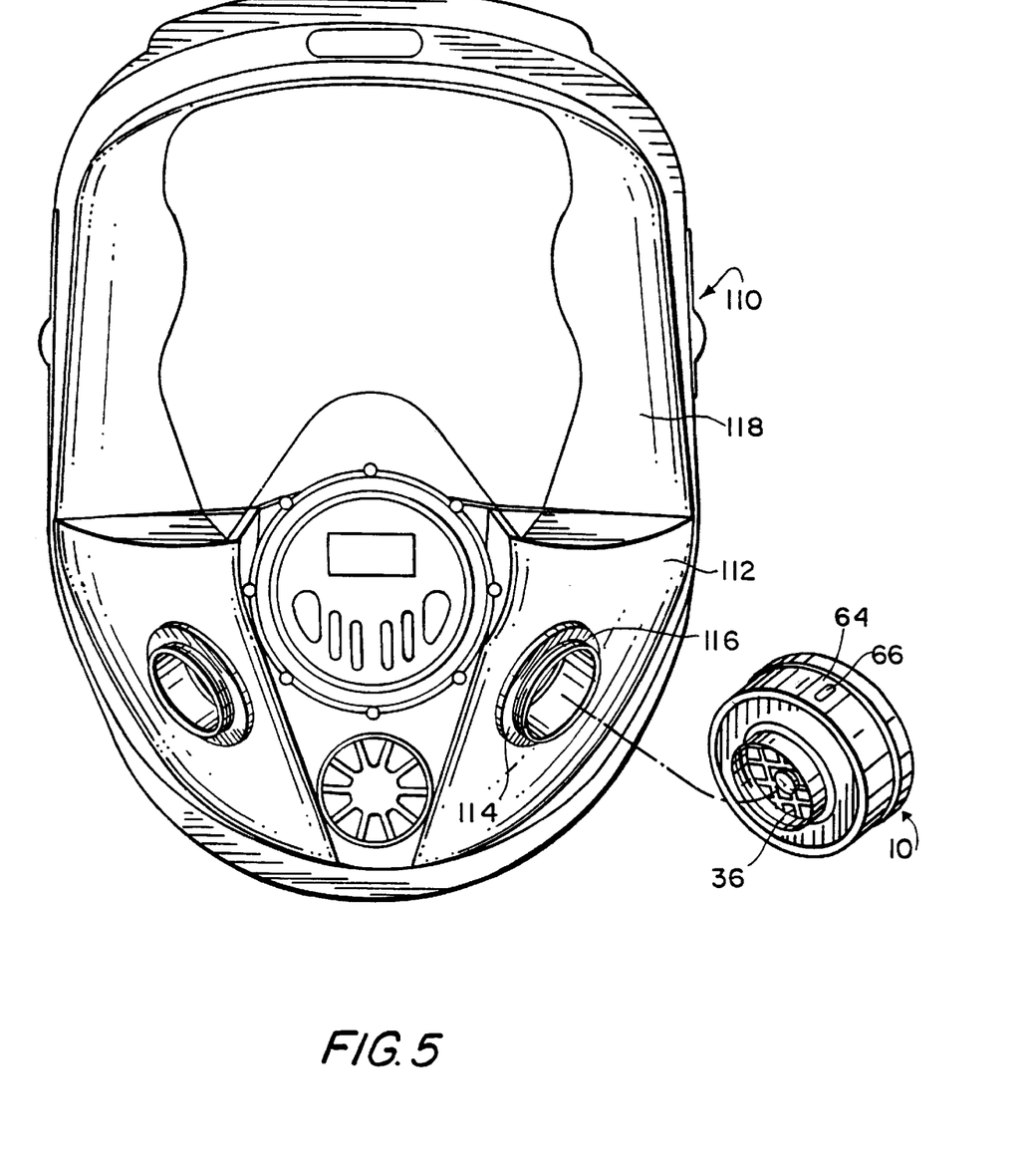
FIG. 5 is a front elevational view of a respirator mask with a perspective view of a cartridge constructed in accordance with the invention illustrating their relationship in use.

As shown in FIG. 5, the ESLI cartridge of the invention is installed, for example, on a full-face respirator mask 110 by engaging the external threads 116 on the male mounting connector 114 located in the cheek area 112 of the mask. In order to utilize the cartridge of the invention with existing respirators of either the full-face or half-mask types, it is necessary to provide a means to enable the wearer to properly align the display window 66 of cartridge 10 so that it will be readily visible during use. The means for adjusting the position of the display window 66 must also insure that the cartridge is securely tightened on the mask's threaded connector 114 and that an air-tight seal is maintained to prevent the admission of contaminant around this connector during use.

In accordance with one preferred embodiment of the invention that is illustrated below, a two-piece mounting assembly is provided. The purpose and function of the two-piece cartridge assembly is to separate the threaded or other mounting means from the cartridge section so that they can rotate or otherwise move independently of each other after the filter assembly is attached to the face piece. This independent movement allows the threads to tighten enough to form the desired seal against the face piece and to also allow the cartridge to continue to rotate so that the indicator can be aligned in the wearer's field of view. A ratchet interface is or other mechanical equivalent employed to provide a positive torque to remove the filter cartridge even after long periods. This function is provided in a preferred embodiment by using a ratchet system with the teeth molded into the cartridge shell and the pawl fingers molded on to the threaded insert.

The two sections are sealed to prevent contaminated air from entering the breathing system downstream of the filter cartridge. The seal is formed by an interference fit in the collar portion where the two sections are frictionally engaged in a snap-fit relation. The seal between the two elements can also be provided by including an "O" ring, a flat elastomeric or soft plastic washer between the two parts forming the assembly; or by providing a skirt seal that is molded in, or assembled onto one or the other of the parts to provide a sealing contact between the moving parts. From the above description and that which follows, other means of providing a rotatable mechanical seal between the attachment members will be apparent to those having ordinary skill in the relevant arts.

As will be described with reference to FIGS. 1, 5 and 6, a mounting assembly is provided that includes threaded flange member 70 that is received in a snap-fit relation on the interior of mounting collar 24 of shell 12. The throat of flange 70 is provided with internal threads 72 adapted to mate with the external mounting threads 116 of the respirator mask. This mounting assembly is secured by a projecting annular rim 80 formed in collar 24 that engages a corresponding seal seat surface in the form of a groove 81 in the adjacent surface of flange member 70. The annular rim 80 and seat groove 81 extend continuously around the respective elements and provide a reliable seal against passage of the contaminant when the cartridge shell and flange members undergo relative rotational movement. It is to be understood that the position of the elements forming the seal 82 can be reversed, i.e., that the annular rim can be formed in the flange member and the annular groove in the mounting collar. When attached, the cartridge is at least partly visible through the viewing lens 118 of the mask 110.

Figure 6:
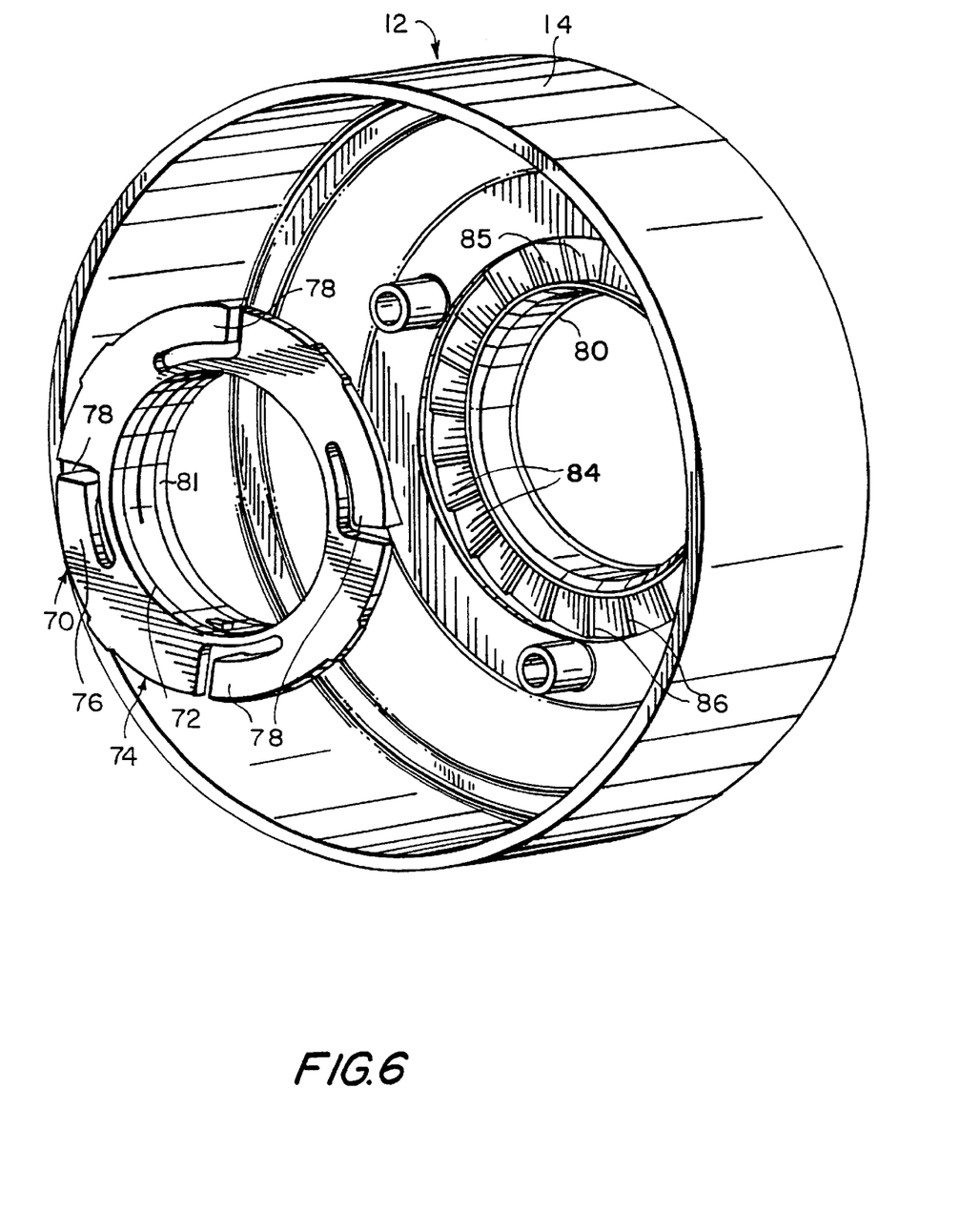
FIG. 6 is an exploded front perspective view of a mounting assembly for the cartridge in accordance with one embodiment of the invention.
Figure 7:
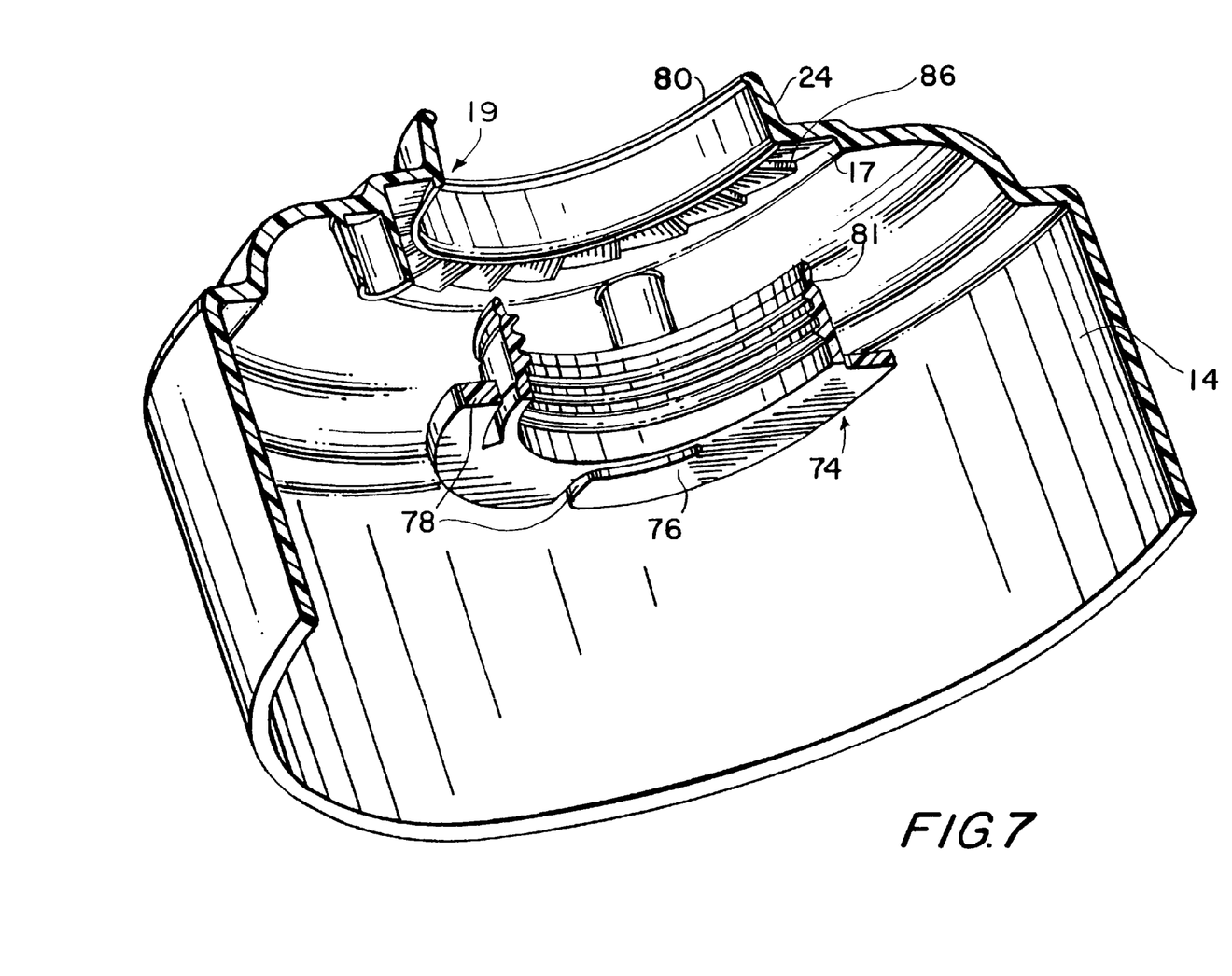
FIG. 7 is a sectional detail of a portion of the assembly shown in FIG. 6.
Figure 8:
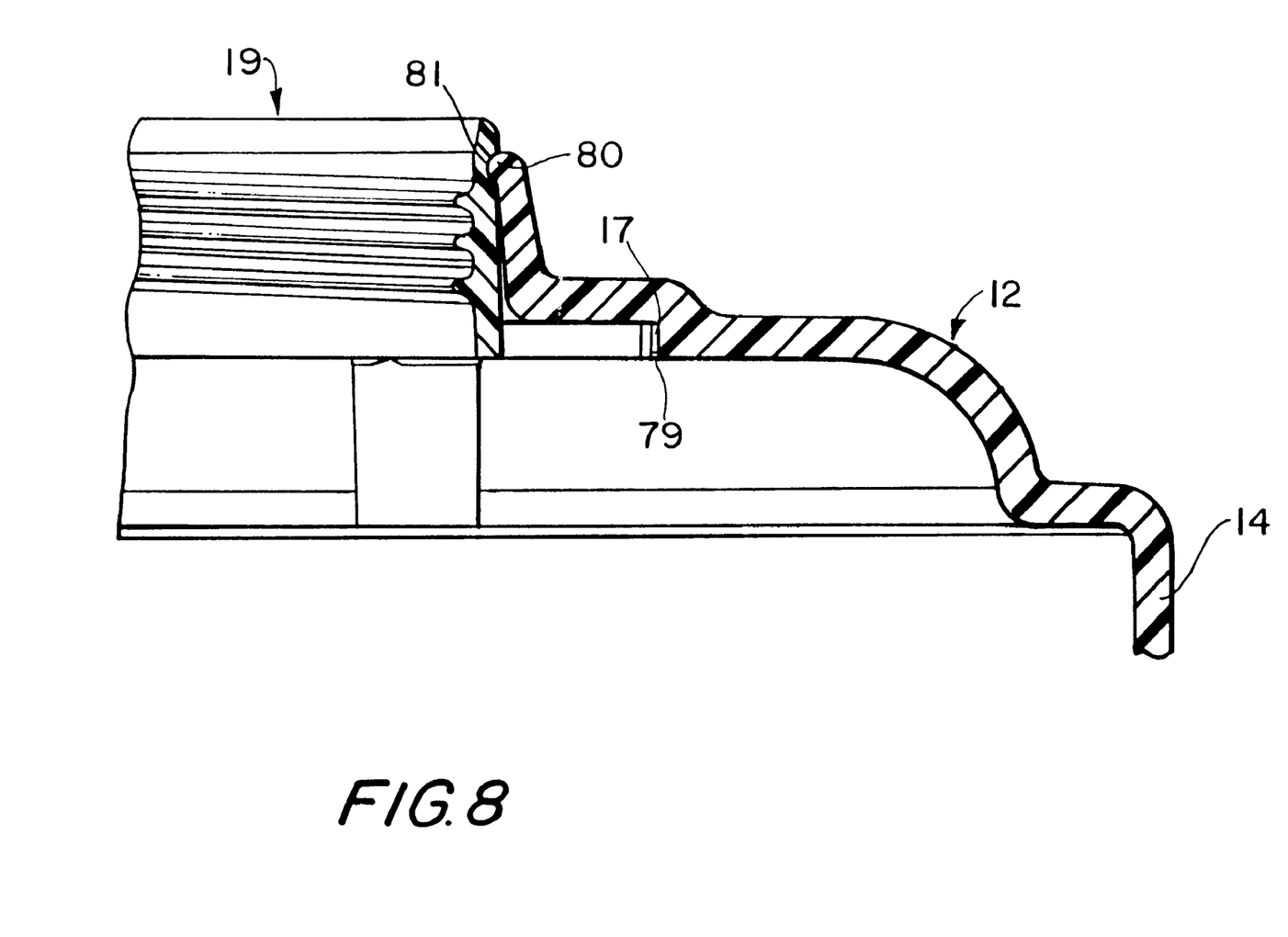
FIG. 8 is an enlarged detail view of a portion of FIG. 1 as indicated in the drawing.

With reference to FIG. 6, it will be seen that the outwardly extending flange 74 is divided into a plurality of separate flange elements 76, each of which is provided with a pawl 78. With reference to FIG. 6 and the sectional view of FIG. 7, it will be seen that the interior shoulder formed between collar 24 and cover 22 is provided with a plurality of teeth 84 over which the plurality of pawl elements 78 can pass when the cartridge 10 is rotated in the clockwise direction, and which teeth engage the pawl when the cartridge is rotated in the opposite or counter-clockwise direction. The lands 85 and stops 86 forming the ratchet teeth 84 are preferably molded into the interior surface of cartridge shell 12. The flange member can be produced with more or fewer flange elements and pawls by varying the configuration of the mold. As will be apparent to one of ordinary skill in the art, the polymeric materials selected for the flange member must be sufficient to provide the resiliency required to permit the elements to be assembled in a snap-fit to form the seal and also to provide the necessary elasticity and resiliency as the pawl members override the ratchet teeth in one direction and engage the stops to enable the cartridge to be removed from its threaded mounting 114 on the respirator.

It is to be understood that other mechanical devices and arrangements can be employed in place of the ratchet assembly described above, to meet the requirements that the cartridge (1) be mounted securely on the mask with an air-tight seal between the cartridge and the interior of the mask being maintained at all times; (2) and that the secured cartridge be rotatable by the wearer to move the display field of the indicator into the wearer's line of sight.

An example of such other means that can be substituted for the ratchet mechanism described above is a slip clutch that will permit the installed cartridge to be rotated indefinitely in a clockwise direction, but will engage the internal threaded mounting member to permit the cartridge to be unscrewed when turned in a counter-clockwise direction. A suitable arrangement for a slip clutch can be installed between the adjacent walls of the collar and the threaded flange member.

This function can also be accomplished by providing other one-way rotational devices, such as roller clutches, ball clutches or friction clutches. Alternative mechanisms include a collar with either a friction or screw locking system or a collar with a lug or "dog" which engages to tighten the threads and disengages to rotate the cartridge as required to position the indicator for viewing by the wearer of the mask.

Means for removing the cartridge from the mounting threads of the mask can include a cam, pawl, rib, or the like, that is resiliently mounted and which engages a corresponding release means only when subjected to manual pressure or pressure applied by an appropriately configured tool that moves the elements into engagement, whereby the cartridge threads are caused to move in the counter-clockwise direction.

As will be apparent to one of ordinary skill in the art, other systems and mechanisms can be utilized to accomplish the desired function of tightening the threads while allowing the position of the indicator to be adjusted by the wearer.

In a particularly preferred embodiment, the opaque border surrounding the display field is printed with one or more different color fields, each color being associated with the starting color of the sensor and/or a color to which the sensor changes after exposure to a specified contaminant. Since the sensor must be designed to detect specific contaminants, e.g., hydrochloric acid (or hydrofluoric acid) vapors, and each contaminant will produce a distinctive characteristic color change of the indicator material incorporated in the sensor, the color changes are predictable for each class of contaminant.

Figure 9:
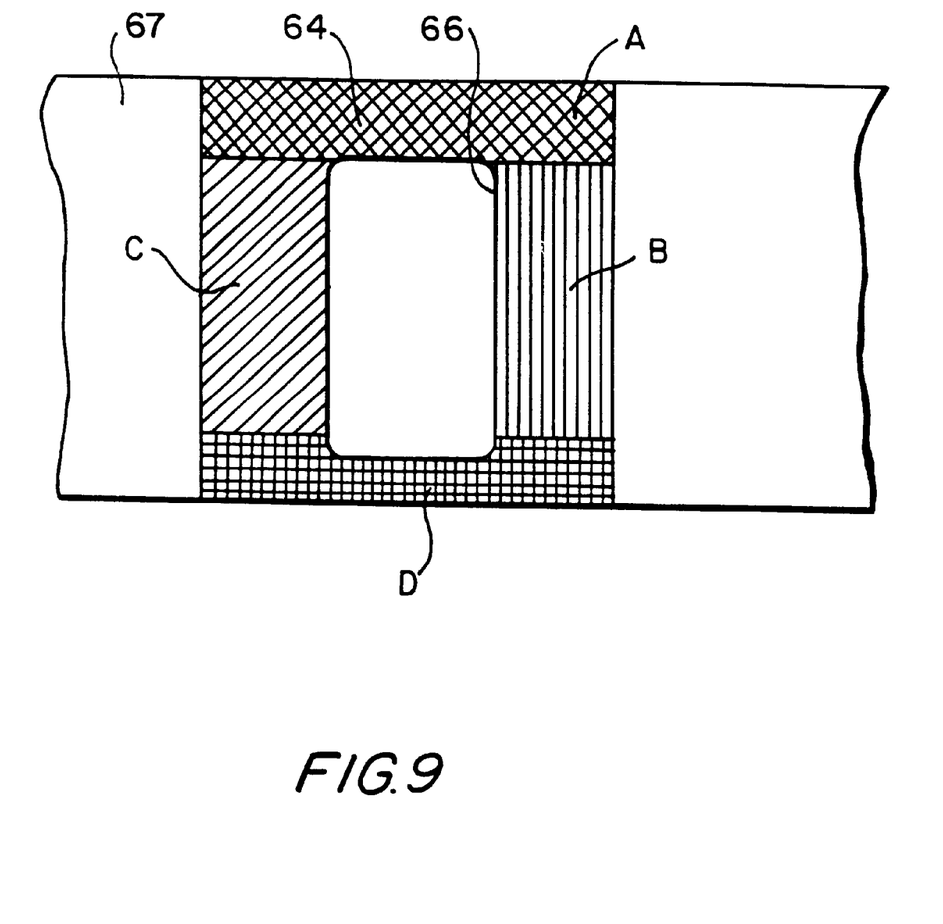
FIG. 9 is a plan view of a color-coded border area around a display window in accordance with the invention.

Thus as illustrated in FIG. 9, the opaque border 64 surrounding the display window 66 is divided into a plurality of color fields, e.g., four color fields, designated A, B, C, and D. The particular colors are associated with the contaminant(s) for which the cartridge is approved for use. The following table provides a typical arrangement:

| Field | Color  | Contaminant  |
|-------|--------|--------------|
| A     | Orange | (Unexposed)  |
| B     | Red    | HCl          |
| C     | Brown  | HF           |
| D     | Peach  | $SO_2$       |

It will be understood from the preceding description that the vertical positioning of the color fields can also be predetermined to provide the desired margin of safety for the use of the cartridge, or conversely, as an indication of when the cartridge should be replaced.

It should be apparent from the foregoing that the service life indicator of the present invention is readily adaptable to various types and forms of respirator cartridges or canisters other than those illustrated in the present drawings. Various modifications and adaptations of the mechanical and chemical forms of the invention here shown and described can also be made to meet particular requirements. Accordingly, the foregoing examples and illustrations are not to be interpreted as restrictive of the invention, the scope of which is to be determined by reference to the following claims.

We claim:

1. A respirator cartridge comprising:
   a cartridge shell having a sidewall, at least a portion of which sidewall is transparent;
   a chemical sensor having a color-changing display field, the sensor being securely positioned proximate an interior surface of a transparent portion of the cartridge sidewall, said display field having an upstream end and a downstream end;
   a display window defined by an opaque border positioned on the transparent portion of the cartridge sidewall, the display window being at least partially aligned with the display field of the sensor, the downstream end of the display field of the sensor extending to the downstream end of the display window formed by the opaque border;
   a chemical sorbent material contained by said cartridge shell and in touching contact with said sensor;
   said cartridge further comprising:
      an outwardly extending mounting collar joined to the cartridge shell, said mounting collar including seal-forming means,
      a threaded flange member having pawl and seal-forming means received in mating relation with said mounting collar,
      ratchet means formed in a surface of the cartridge shell to operatively engage the pawl means in the flange member, where said seal-forming means comprise an annular ring and a corresponding annular seat, whereby said flange member is securely joined to said cartridge shell in fluid-tight rotatable relation.

2. The cartridge of claim 1 where the sensor is secured in position by adhesive.

3. The cartridge of claim 1 in which the opaque border defining the display window is an elongated web of opaque material and the display window is an aperture in the web.

4. The cartridge of claim 3 in which the elongated web extends around at least a portion of the periphery of the cartridge shell.

5. The cartridge of claim 3 where the elongated web is provided with printed informational fields.

6. The cartridge of claim 3 where the color of the elongated web proximate the display window contrasts visually with the color of the color-changing field of the sensor after exposure of the sensor to a contaminant.

7. The cartridge of claim 3 where the elongated web is adhesively bonded to the exterior of the shell sidewall.

8. The cartridge of claim 1 in which the opaque area is a chemically-resistant coating on the cartridge sidewall.

9. The cartridge of claim 8 where the exterior surface of the cartridge sidewall is coated.

10. A method of assembling a replaceable respirator cartridge comprising the following steps:
    providing a cartridge shell having an outwardly extending mounting collar and a sidewall, at least a portion of which sidewall is transparent;
    securely positioning a chemical sensor having a color-changing display field proximate an interior surface of a transparent portion of the cartridge sidewall, said display field having an upstream end and a downstream end;
    positioning a display window defined by an opaque border on the transparent portion of the cartridge sidewall, the display window being at least partially aligned with the display field of the sensor and a segment of the opaque border obscuring a portion of the downstream end of the sensor;
    filling the cartridge with a chemical sorbent material to contact a surface of the sensor opposite the display field;
    providing a mounting assembly having seal-forming means and one-way rotational means; and
    joining the mounting assembly to the collar, whereby said cartridge can be continuously sealingly rotated when mounted to a respirator mask.

11. The method of claim 10 the chemical sensor is secured in position to the interior surface of the sidewall.

12. The method of claim 11 where the chemical sensor is secured in position by adhesive.

13. The method of claim 11 where the chemical sensor is secured in position by a mechanical fastener.

14. The method of claim 10 where the chemical sensor is formed from a plurality of superposed polymeric sheets that are sealed around their edges to form a packet.

15. The method of claim 14 where one of the exterior sidewalls of the sensor packet is gas and vapor permeable.

16. The method of claim 15 in which the permeable sidewall of the sensor packet is positioned away from the cartridge sidewall.

17. The method of claim 10 where the display window is formed in an elongated web of opaque material and the method further comprises securing the elongated web to the exterior surface of the cartridge sidewall.

18. The method of claim 17 which includes the step of adhesively bonding the elongated web to the cartridge sidewall.

19. The method of claim 17 that includes encircling the cartridge sidewall with the elongated web, whereby the sorbent material inside the cartridge is obscured.

20. The method of claim 10 where the display window is formed by applying an opaque coating to the cartridge sidewall.

21. The method of claim 20 where the opaque coating is applied to the exterior surface of the cartridge sidewall.

22. The method of claim 21 where the sensor is securely positioned proximate the cartridge sidewall after application of the opaque coating.

23. The method of claim 10 where the color of the opaque area defining the display window provides a visual contrast to the color-changing field of the sensor.

24. The method of claim 10 which includes the further steps of providing the mounting collar and the mounting assembly with elements that cooperate to form a rotatable seal and moving the elements into engagement to form a rotatable seal when the assembly is joined to the collar.

25. The method of claim 24 where the rotatable seal is formed by a projecting annular rim and a corresponding seat in the form of a resilient groove, and the seal is assembled by pressing the projecting rim into the seat.

26. The method of claim 10 where the one-way rotational means is comprised of a circular array of ratchet teeth formed in a surface of the shell adjacent the mounting collar and at least one pawl formed in the mounting assembly, whereby the pawl engages the ratchet teeth when the mounting assembly is joined to the collar.

* * * * *